(12) United States Patent
Morrissette

(10) Patent No.: US 9,925,690 B2
(45) Date of Patent: Mar. 27, 2018

(54) CHUTE FOR CEMENT TRUCK AND METHOD OF FABRICATING A CHUTE FOR A CEMENT TRUCK

(71) Applicant: GROUPE PPD INC., Waterville (CA)

(72) Inventor: Sylvain Morrissette, Sherbrooke (CA)

(73) Assignee: GROUPE PPD INC., Waterville (CA)

( * ) Notice: Subject to any disclaimer, the term of this patent is extended or adjusted under 35 U.S.C. 154(b) by 0 days.

(21) Appl. No.: 15/505,500

(22) PCT Filed: Sep. 3, 2015

(86) PCT No.: PCT/CA2015/050844
§ 371 (c)(1),
(2) Date: Feb. 21, 2017

(87) PCT Pub. No.: WO2016/033688
PCT Pub. Date: Mar. 10, 2016

(65) Prior Publication Data
US 2017/0266843 A1  Sep. 21, 2017

Related U.S. Application Data

(60) Provisional application No. 62/045,250, filed on Sep. 3, 2014.

(51) Int. Cl.
*B65G 11/00* (2006.01)
*B28C 5/42* (2006.01)
(Continued)

(52) U.S. Cl.
CPC .......... *B28C 5/4248* (2013.01); *B28C 5/0818* (2013.01); *B65G 11/026* (2013.01); *B65G 11/186* (2013.01)

(58) Field of Classification Search
CPC ... B28C 5/4248; B28C 5/4251; B28C 5/2081; B65G 11/00; B65G 11/02; B65G 11/12; B65G 11/126; B65G 11/18; B65G 11/186
(Continued)

(56) References Cited

U.S. PATENT DOCUMENTS 4,054,194 A      10/1977  Davis
5,192,178 A  *   3/1993   Silbernagel ........... B28C 5/4251
                                                                    193/10

(Continued)

FOREIGN PATENT DOCUMENTS

| CN | 202164017 U | 3/2013 |
| CN | 203973765 U | 12/2014 |
| WO | 2015048841 A1 | 4/2015 |

OTHER PUBLICATIONS

International Search Report of corresponding PCT application No. PCT/CA2015/050844.

*Primary Examiner* — James R Bidwell
(74) *Attorney, Agent, or Firm* — Hugh Mansfield

(57) ABSTRACT

A chute assembly for directing cement from a cement truck is disclosed. The chute comprises an elongate chute of generally u-shaped cross section fabricated from UHMWPe and comprising an upper end and a lower end, a plurality of reinforcing rods arranged along a length of and encased within the UHMWPe, one end of each of the rods adjacent the upper end and another end of each of the rods adjacent the lower end, a pair of u-shaped collars, an upper one of the collars adjacent the upper end and a lower one of the collars adjacent the lower end, and a fastener for securing each of the collars to their respective rod ends. A method of fabrication is also disclosed.

8 Claims, 5 Drawing Sheets

(51) Int. Cl.
*B28C 5/08* (2006.01)
*B65G 11/02* (2006.01)
*B65G 11/18* (2006.01)

(58) Field of Classification Search
USPC .............................................. 193/10, 2 R, 4
See application file for complete search history.

(56) References Cited

U.S. PATENT DOCUMENTS

| | | | | |
|---|---|---|---|---|
| 6,367,606 B1* | 4/2002 | Skalla | ................... | B28C 5/0818 |
| | | | | 193/2 R |
| 6,845,858 B2* | 1/2005 | McVay | ................... | B65G 11/18 |
| | | | | 193/2 R |
| 6,918,481 B2* | 7/2005 | Quigley | ............... | B65G 11/026 |
| | | | | 193/2 R |
| 6,971,495 B2* | 12/2005 | Hedrick | ................ | B65D 88/28 |
| | | | | 193/2 R |
| 2004/0154898 A1* | 8/2004 | McVay | ............... | B65G 11/026 |
| | | | | 193/2 A |

\* cited by examiner

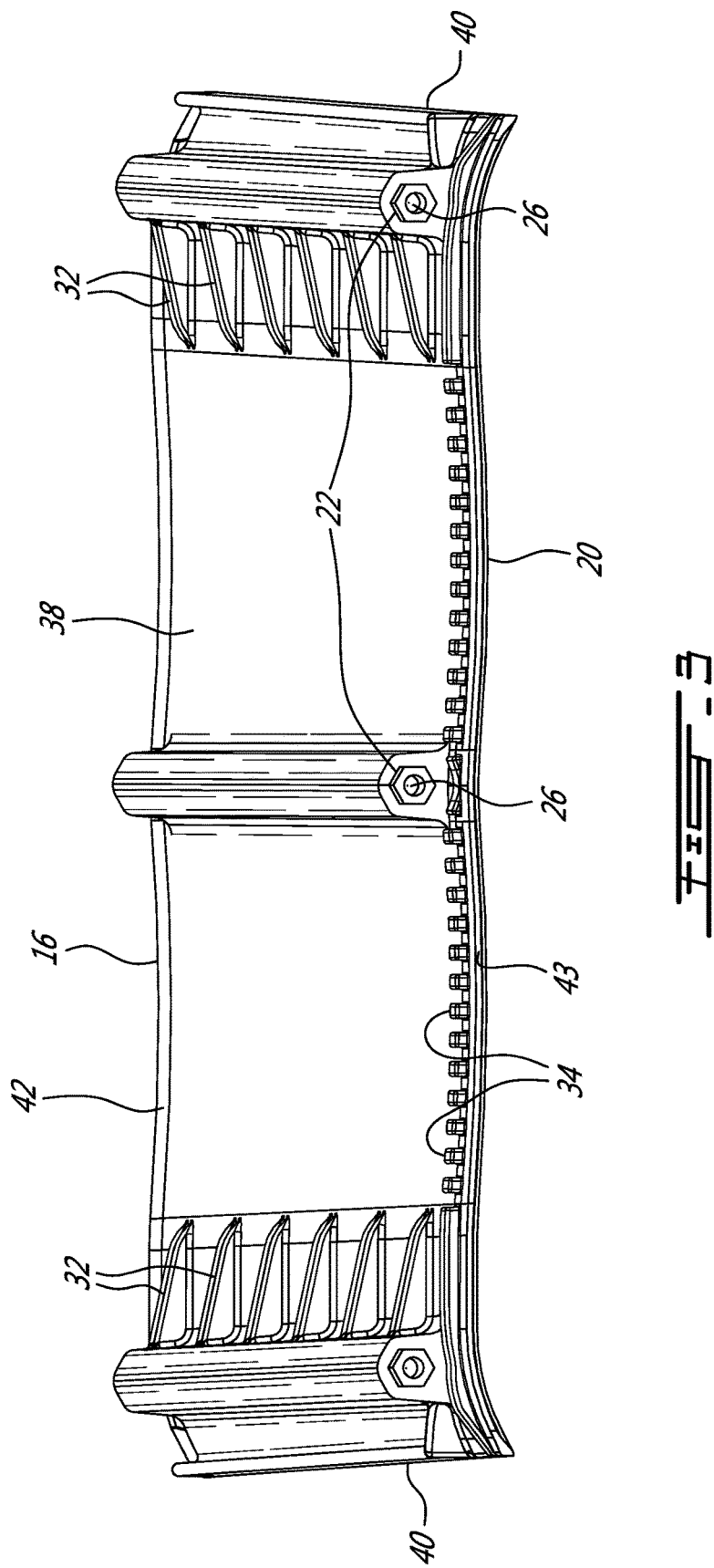

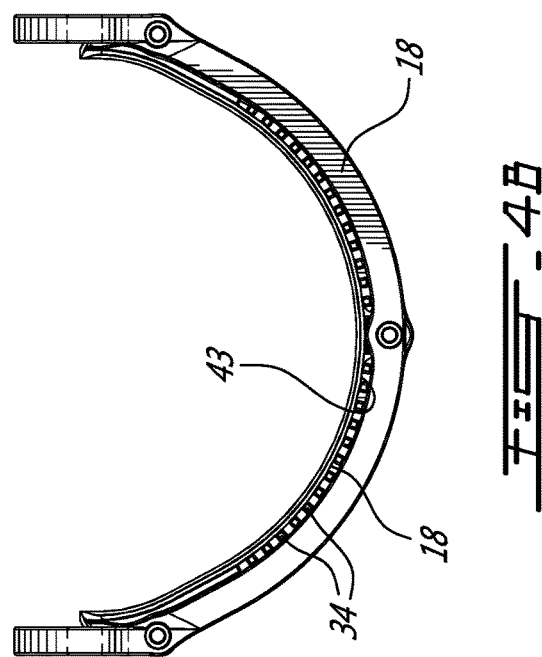
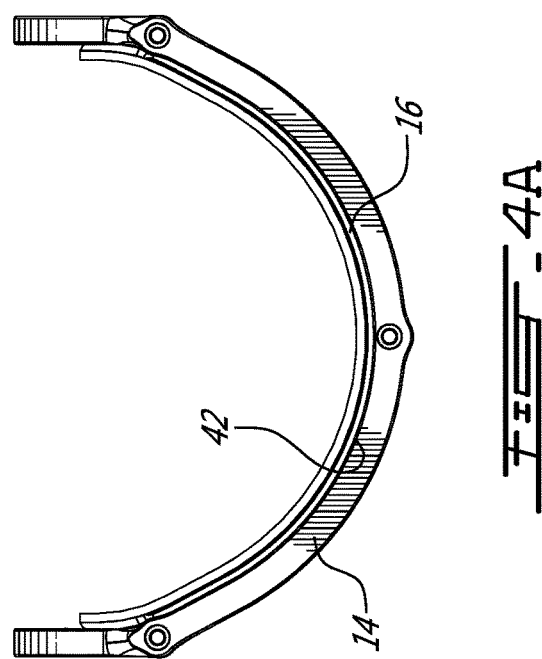

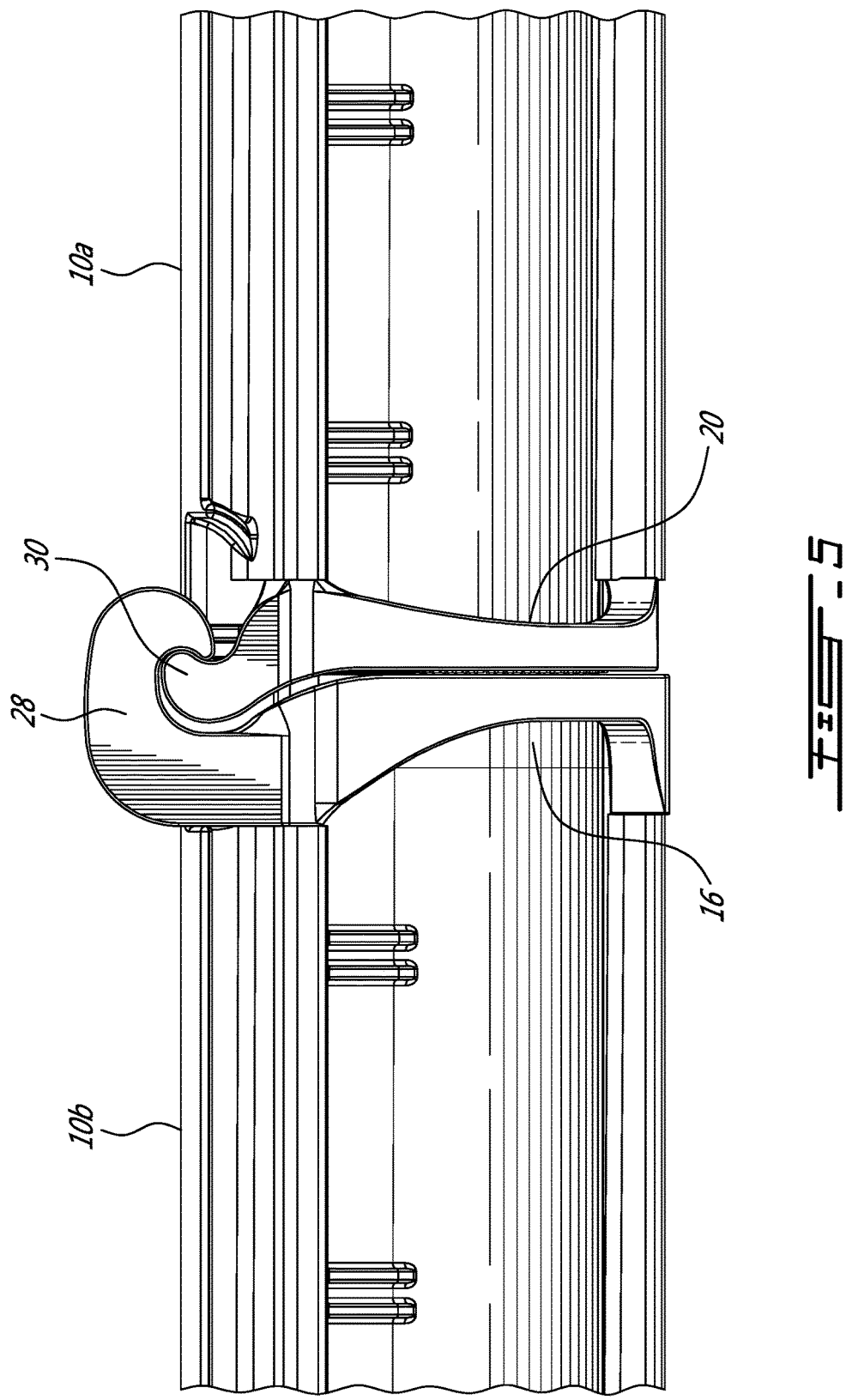

CHUTE FOR CEMENT TRUCK AND METHOD OF FABRICATING A CHUTE FOR A CEMENT TRUCK

CROSS-REFERENCE TO RELATED APPLICATIONS

This application is a National Entry Application of PCT application no PCT/CA2015/050844 filed on Sep. 3, 2015 and published in English under PCT Article 21(2), which itself claims benefit of U.S. provisional application Ser. No. 62/045,250, filed on Sep. 3, 2014. All documents above are incorporated herein in their entirety by reference.

FIELD OF THE INVENTION

The present invention relates to a chute for a cement truck and a method of fabricating a chute for a cement truck. In particular, the present invention relates to a chute for a cement truck fabricated from UHMWPe.

BACKGROUND OF THE INVENTION

The prior art reveals cement truck chutes manufactured from steel and aluminium. One drawback of such prior art chutes is that due to the corrosive and abrasive nature of the cement the chutes become quickly worn and must be replaced. In order address this drawback the prior art discloses providing a liner covering the metal chute and made of a material which is better able to withstand the abrasive cement such as UHMWPe. These liners have the drawback that they are typically riveted to the chute and therefore quickly become dislodged thereby exposing the metal chute.

SUMMARY OF THE INVENTION

In order to address the drawbacks of the prior art, there is disclosed a chute assembly for directing cement from a cement truck. The assembly comprises an elongate chute of generally u-shaped cross section fabricated from UHMWPe and comprising an upper end and a lower end, a plurality of reinforcing rods arranged along a length of and encased within the UHMWPe, one end of each of the rods adjacent the upper end and another end of each of the rods adjacent the lower end, a pair of u-shaped collars, an upper one of the collars adjacent the upper end and a lower one of the collars adjacent the lower end, and a fastener for securing each of the collars to their respective rod ends.

There is also disclosed a method for fabricating a chute for directing cement from a cement truck. The method comprises placing a plurality of reinforcing rods generally in parallel in a mould with a powdered UHMWPe, wherein each end of the rods is adjacent a respective edge of the mould, closing the mould and applying heat to the mould until the UHMWPe is molten, removing the UHMWPe and reinforcing rods from the mould once the UHMWPe has solidified, arranging a u shaped collar at each end of the chute, each of the collars having a curvature configured to match that of the end of the chute to which it is attached, and securing the collars to the ends of the rods. At least the u-shaped collar arranged at the upper end of the chute comprises a pair of hooks adapted for attachment to the cement truck.

Additionally, there is provided a method for fabricating a chute for directing cement from a cement truck. The method comprises forming a substantially flat chute blank from UHMWPe, the chute blank having a first edge opposite a second edge, bending the chute blank about an axis between the first edge and the second edge to form an elongate chute having an open top, a closed bottom and a u-shaped cross section, and attaching a pair of u-shaped collars manufactured from a rigid durable material to respective ends of the elongate chute, each of the collars having a curvature configured to match that of the end of the chute to which it is attached.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

FIG. 3 provides a raised front view of a blank for preparing a chute in accordance with an illustrative embodiment of the present invention;

FIGS. 4A and 4B provide end plan views of respectively the upper and lower ends of a chute assembly in accordance with an illustrative embodiment of the present invention; and FIG. 5 is a partial side plan view of a pair of joined chute assemblies.

DETAILED DESCRIPTION OF THE ILLUSTRATIVE EMBODIMENTS

Figure 1:
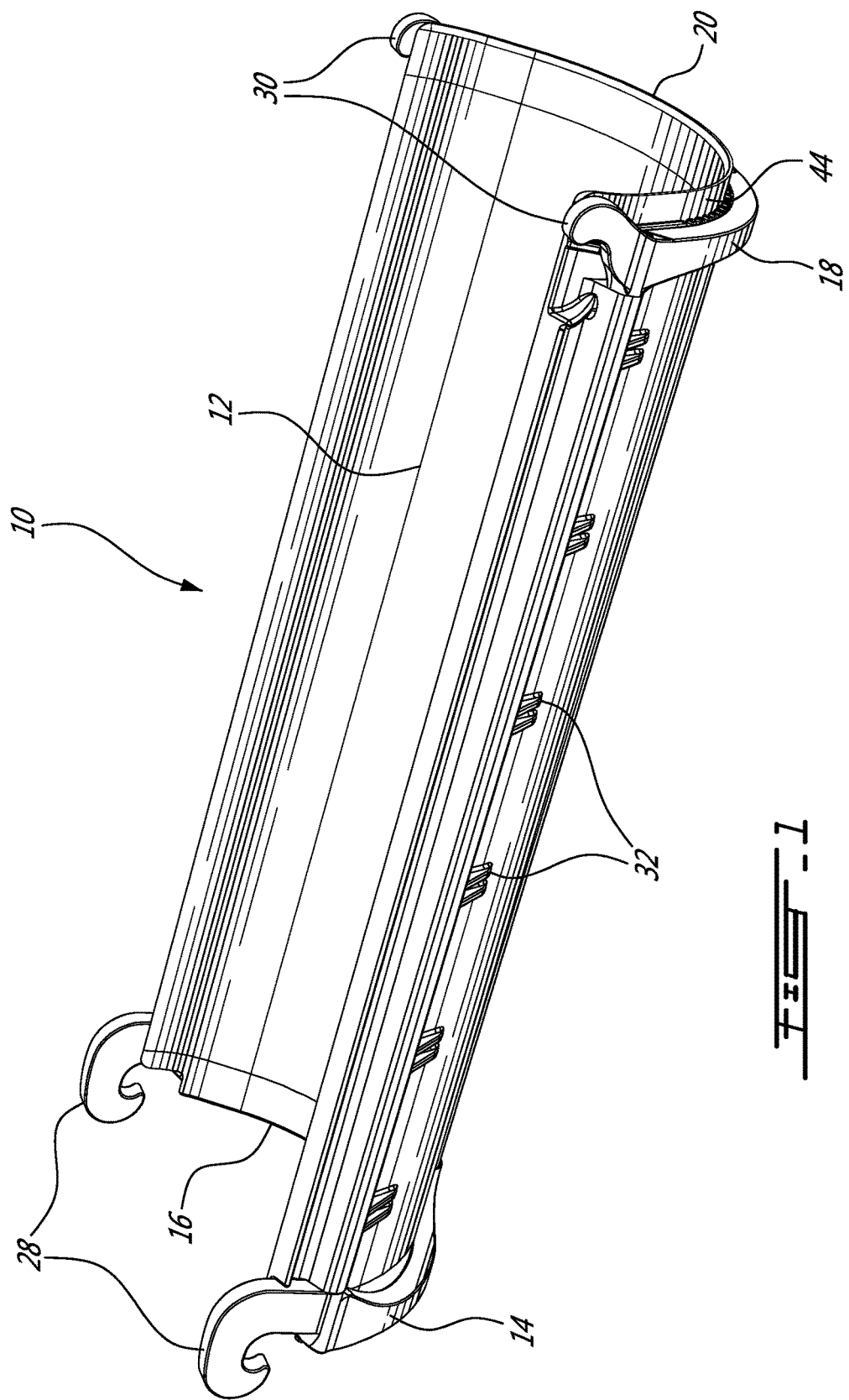
FIG. 1 is a raised right perspective view of a chute assembly in accordance with an illustrative embodiment of the present invention.

Referring now to FIG. 1, and in accordance with an illustrative embodiment of the present invention, a chute assembly for a cement truck, generally referred to using the reference numeral 10, will now be described. The chute 10 comprises a tapered elongate chute 12 of generally u-shaped cross section, a pair of u-shaped collars comprising an upper collar 14 adjacent an upper end 16 of the elongate chute 12 and a lower collar 18 adjacent a lower end 20 of the elongate chute 12.

Figure 2:
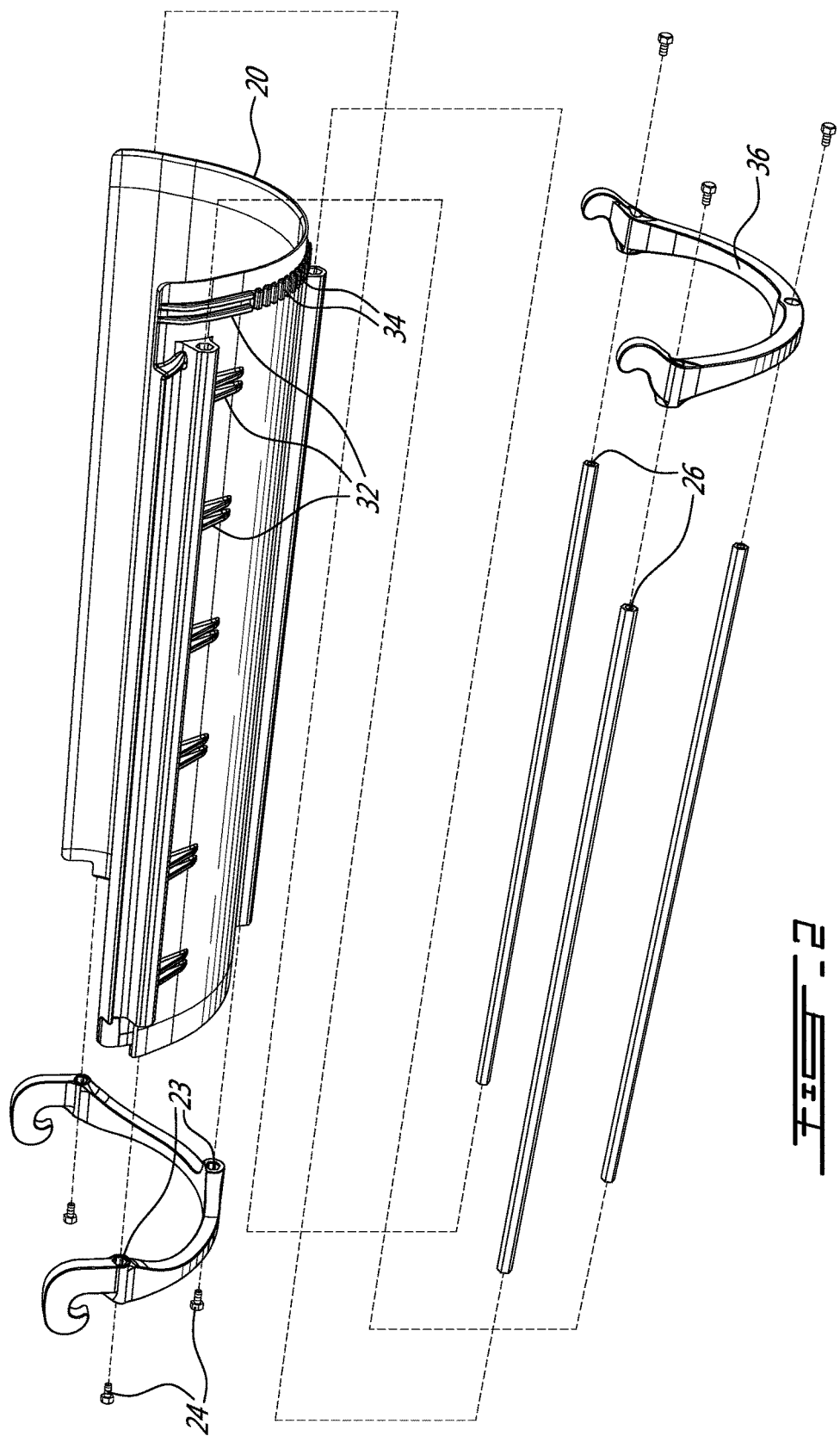
FIG. 2 is a raised right exploded view of a chute assembly in accordance with an illustrative embodiment of the present invention.

Referring to FIG. 2, the collars 14, 18 are secured to their respective ends 16, 20 of the chute 12 via a plurality of rods as in 22 which, as will be discussed below may be imbedded in the material used to fabricate the chute 12 during manufacture. The collars 14, 18 and the rods 22 are manufactured from a rigid durable material such as cast or machined aluminium, steel, a composite comprising carbon fibre, or the like, although in a particular embodiment the collars 14, 18 are manufactured from a first material, such as machined aluminium while the rods 22 are manufactured from a second material such as stainless steel. The collars 14, 18 comprise rod end receiving bores 23 into which the ends of the rods 22 are inserted and then secured using fasteners 24 such as bolts or the like which engage corresponding threaded bores as in 26 provided in each end of the rods 22. The rods 22 are illustratively of a non-circular hexagonal cross section such that their rotation is prevented when imbedded in the material of the chute 12.

Referring back to FIG. 1, the upper collar 14 comprises a pair of hooks as in 28 at each end of the upper collar 14 for engaging with posts or other protuberances typically found of the outlet chute of a cement truck (all not shown) thereby removeably securing the chute 10 to the truck during operation. The lower collar 18 comprises a pair of protuberances as in 30 at each end of the lower collar 18 for engaging, for example, the hooks as in 28 of additional chute assemblies 10.

Referring again to FIG. 2, the chute 12 may comprise a plurality of reinforcing ribs as in 32 for providing additional rigidity. Additionally, a series of raised tabs as in 34 are arranged towards a lower end 20 of the chute 12 which abut against an inner surface 36 of the lower collar 18 when the chute assembled 10 is assembled.

Referring to FIG. 3 in addition to FIG. 1, the chute assembly 10 is illustratively manufactured from a relatively flat chute blank 38 which is then bent to form the chute 12 and fit the collars 14, 18. The chute blank 38 is manufactured from Ultra High Molecular Weight Polyethylene (UHM-WPe).

UHMWPe is a type of the thermoplastic polyethylene having extremely long chains with a molecular mass usually between 2 and 6 million u. The longer chain serves to more effectively transfer load to the polymer backbone by strengthening intermolecular interactions. This results in a very tough material, with the highest impact strength of any thermoplastic presently made. UHMWPe is odorless, tasteless, and nontoxic. UHMWPe is highly resistant to corrosive chemicals, extremely low moisture absorption and a very low coefficient of friction. UHMWPe is self-lubricating and is highly resistant to abrasion, in some forms being 15 times more resistant to abrasion than carbon steel. Its coefficient of friction is significantly lower than that of nylon and acetal, and is comparable to that of polytetrafluoroethylene (PTFE, Teflon), but UHMWPe has better abrasion resistance than PTFE.

Although the chute 12 can be manufactured, for example, by machining a flat piece of UHMWPe, it is preferable to manufacture the chute via moulding. In this regard, a UHMWPe powder is placed in a mould (not shown) together with the rods 22 positioned appropriately, the mould closed and then heat applied to melt the UHMWPe (typically above about 136° C.) and fill the mould while encasing the rods in UHMWPe (illustratively with the exception of the threaded bores 26 and the ends of the rods as in 22). Features such as the reinforcing ribs 32 and the raised tabs 34 are included in the mould. Additional features can also be moulded into the blank 38, such as a pair of chute lips 40 or the like. Once the mould has cooled sufficiently, the blank 38 is removed from the mould and, typically while still warm, gently curved to fit the upper collar 14 and lower collar 18 following which the rods 22 are inserted into the rod end receiving bores 23 and secured to the collars 14, 18 using the fasteners 24.

Still referring to FIG. 3 in addition to FIG. 1 UHMWPe, although naturally white in colour, can be coloured with pigments for a given implementation. One advantage of UHMWPe in this regard is that the pigment is uniform throughout the UHMWPe, such that as the surface of the UHMWPe is abraded, the chosen colouring is maintained. Additionally, the mould can be easily machined to include other relief features such as contouring or company names or the like moulded, for example, into the side of the chute 12.

Referring to FIGS. 4A and 4B in addition to FIGS. 3 and 1, the upper end 16 of the chute blank 38 is illustratively wider than the lower end 20 of the chute blank 38 such that when the chute blank 38 is curved to fit the form of the collars 14, 18, the radius of curvature of the lower end 20 is less than the radius of curvature of the upper end 16. In this regard, the underside 42 of the upper edge 16 rests against an inner surface of the upper collar 14 while, through provision of the tabs as in 34, the underside 43 of the lower edge is prevented from resting against an inner surface of the lower collar 18. Additionally, while the upper edge 16 of the chute 12 is flush with an outer edge of the upper collar 14, the lower edge 20 of the chute 12 extends beyond the lower collar 18 thereby forming a lip 44.

Referring to FIG. 5, provision of a smaller radius of curvature and a lip 44 for the lower edge 20 of the chute 12 allows multiple chute assemblies as in 10 to be arranged together by over lapping the lower edge 20 of a first chute assembly 10a with the upper edge 16 of a second chute assembly 10b as shown while engaging the hooks 28 with the protuberances 30. As will now be apparent to a person of skill in the art, consecutive chute assemblies as 10 can be joined with one another by connecting the hooks 28 and protuberances 30 as a hinge and then pivoting the assemblies relative to one another such that the upper edge 18 of the second chute assembly 10b butts against the lower edge 20 of the first chute 10a assembly. When assembled, the lip 44 of the first chute assembly 10a provides a seal against the inside of chute 12 of the second chute assembly 10b thereby preventing cement and the like from escaping as well as ensuring that the hooks 28 remain well secured to the protuberances 30.

Referring back to FIG. 3, as the chute blank 38 is broader at the upper end 16 than at the lower end 20, the outer pair of rods as in 22 are arranged to diverge slightly towards the lower end 20 yet generally along the length of the chute 12 when assembled. The middle rod as in 22 is arranged in parallel to the length of the chute 12.

Although the present invention has been described hereinabove by way of specific embodiments thereof, it can be modified, without departing from the spirit and nature of the subject invention as defined in the appended claims.

What is claimed is:

1. A chute assembly for directing cement from a cement truck comprising:
    an elongate chute of generally u-shaped cross section fabricated from UHMWPe and comprising an upper end and a lower end;
    a plurality of reinforcing rods arranged along a length of and encased within said UHMWPe, one end of each of said rods adjacent said upper end and another end of each of said rods adjacent said lower end;
    a pair of u-shaped collars, an upper one of said collars adjacent said upper end and a lower one of said collars adjacent said lower end; and
    a fastener for securing each of said collars to their respective rod ends.

2. The chute assembly of claim 1, wherein at least said upper one of said collars comprises a hook at either end adapted for attachment to the cement truck.

3. The chute assembly of claim 1, wherein a pair of said rods are arranged adjacent respective long edges of said elongate chute and a third of said rods is arranged at a bottom of said chute.

4. The chute assembly of claim 1, wherein said elongate chute is tapered.

5. The chute assembly of claim 1, comprising three of said reinforcing rods.

6. The chute assembly of claim 1, wherein each of said collars is manufactured from aluminium.

7. The chute assembly of claim 1, wherein said reinforcing rods are manufactured from stainless steel.

8. The chute assembly of claim 1, wherein each end of said rods comprises a threaded bore and said fastener comprises a bolt and washer.

\* \* \* \* \*